United States Patent Office 3,523,920
Patented Aug. 11, 1970

3,523,920
CROSS-LINKED LACTONE POLYMERS AND METHODS FOR PRODUCING SAME
Herman S. Schultz, Easton, Pa., assignor to GAF Corporation, New York, N.Y., a corporation of Delaware
No Drawing. Filed June 5, 1968, Ser. No. 734,538
Int. Cl. C08g 17/02, 51/04; C08k 1/02
U.S. Cl. 260—37
10 Claims

ABSTRACT OF THE DISCLOSURE

Improved polymers are produced by cross-linking polylactones with a free radical initiator. The resultant polymers are much less sensitive to solvent attack and have improved softening points.

---

The present invention relates to new polymers and methods for making same, and in particular to cross-linked polylactone homopolymers and methods for producing same. The term "polylactone" as used herein is meant to cover polyesters made from lactones by the proliferative opening of the lactone ring.

While the polymerization of lactones to yield products ranging from viscous liquids to tough, crystalline solids is known (cf. U.S. Patent 3,021,310) such polymers are low melting materials which are solvent sensitive, i.e. attacked and dissolved by such common solvents as toluene and acetone.

It has now been discovered that polylactones as heretofore prepared and as produced by methods hereinafter disclosed and exemplified may be vastly improved (insofar as their thermal properties are concerned and also in their resistance to solvent attack and dissolution) by cross-linking reactions, thereby rendering such products useful in a variety of areas not feasible for the precursor polymers. Products can be made ranging from thermoplastic materials with improved properties that can still be manipulated, to fully thermoset materials. This depends on specific preparative conditions and formulations. The starting polymers can be compounded with fillers and cross-linking agents before reaction to give even more enhanced improvement to the properties of the starting polylactones. In addition, unbranched homopolymers may be mixed and utilized in accordance with the present invention.

The polylactone precursors of the final products described herein are saturated compounds; that is, they contain no double bonds. They are also of high molecular weight and can produce tough films nad filaments although they are inferior in solvent resistant and thermal properties to the products of this invention. Thus, it now becomes possible to solvent-spin fibers from polylactones and then treat the fibers to render them insensitive to common solvents and improve thermal properties. The same technique can be applied to the production of films, coatings, and other shaped forms to achieve the same advantages by such diverse techniques as compression, transfer, and injection molding as well as extrusion and calendering. Films, fibers coatings and other shaped articles can also be made by the above methods after the cross-linked polylactones have been prepared by well-controlled formulation with cross-linking agents and optionally fillers to preserve manipulability but still sufficient to get improved insensitivity to solvents and improved thermal properties. The improved polylactones of this invention are also useful as adhesives or components of adhesives for various substrates, similar or dissimilar, including, of course, substrates of the improved polylactones as well. The new polymers herein described are also useful as permanent plasticizers and/or processing aids and/or impact improvers for many resin systems and may be employed to modify the properties of or adhere to polyolefins, polyesters, polyacrylates, polystyrene, polyethers, polyamides, polyvinyl chloride, polyvinyl ethers, polycarbonates, polyvinyl ester, polyacetals. ABS type polymers, etc., homo and copolymers and the like. These can be prepared beforehand or in situ in combination with other components with which they can cross-link.

It is therefore an object of this invention to provide new and useful polylactones.

It is another object of this invention to provide new and useful cross-linked polylactones of improved thermal properties and outstanding solvent resistance.

It is still another object of the present invention to provide processes for the preparation of polylactone homopolymers, and more particularly, cross-linked polylactones.

Other objects will appear hereinafter as the description proceeds.

The polylactone homopolymers to which the present invention is directed are derived from lactones having at least 5 carbon atoms in the lactone ring and which are polymerized using organo-metallic compounds wherein the metals are from Groups I–A, II–A, II–B, and III–A of the periodic chart elements.

The lactones contemplated herein have the general formula:

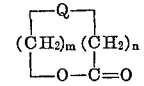

wherein:

(I) Q is —O— or —S— or —CH$_2$—
(II) m and n are integers from 1 to 10; and
(II) m and n are at least 3.

The preferred lactones are those wherein m+n ranges from 3 to 7.

Examples, but by no means limiting, of suitable lactones are: δ-valerolactone, ε-caprolactone, ω-enantholactone, ω-caprylolactone, 2-p-dioxonone, ω-nonanaloctone.

Suitable initiators for preparing polylactones from the foregoing lactones have the following general formulae:

(I)                     R—M$_1$
(II)                (R)$_{n'}$—M$_2$—(R')$_{m'}$
and
(III)

wherein the M's are metals of groups I–A, II–A, II–B, and III–A; R may be alkyl, aryl, aralkyl or alkaryl; R' may be hydrogen, halogen, hydroxy, alkoxy, acyloxy, aryloxy, aralkoxy, and alkaryloxy; $n'$ is an integer from 1 to 2 for Group II metals and 1 to 3 for Group III–A metals; $m'$ is 0 or 1 for Group II metals; 0, 1 or 2 for Group III–A metals; $n'+m'=2$ for Group II metals and $n'+m'=3$ for Group III–A metals. In Formulae I and III M$_1$ is a Group I–A metal (alkali metal); M$_2$ is either a Group II–A, II–B, or III–A metal; and M$_3$ is a Group III–A metal; $p$ is an integer from 0 to 3; $q$ is an integer from 1 to 4; and $p+q=4$.

Suitable catalysts include:

methyl sodium
    isopropyl sodium
    ethyl lithium
    n-butyl lithium
    iso-octyl lithium
    phenyl lithium
    2-tolyl lithium benzyl lithium
benzyl sodium
phenethyl sodium
phenethyl lithium
phenethyl potassium
dodecyl potassium
isobutyl potassium
naphthyl potassium
naphthyl lithium
diethyl magnesium
di-n-propyl magnesium
diphenyl magnesium
n-butyl isobutyl zinc
n-butyl isobutoxy zinc
n-amyl, n-amoxy cadmium
trimethyl aluminum
diethyl aluminum hydride
tributyl aluminum
tri-isobutyl aluminum
triphenyl aluminum
tri-n-hexyl aluminum
diisopropyl aluminum hydride
di-n-hexyl aluminum hydride
methyl aluminum dihydride
benzyl aluminum dihydride
dibenzyl aluminum hydride
phenyl aluminum dihydride
methyl diphenyl aluminum
ethyl phenyl aluminum hydride
4-(ethoxybutyl)-diethyl aluminum
ethoxy dibutyl aluminum
isobutoxy isobutyl aluminum hydride
isobutoxydiethyl aluminum
diphenyl aluminum hydride
methylgalliumdichloride
triethylgallium The general procedure for polymerizing the lactones involves adding the selected catalyst in an amount varying from 0.001% to up to 5% by weight thereof based on the weight of the lactone, to the lactone either in bulk or in an inert, liquid suspending medium which may or may not be a solvent for the lactone. A preferred catalyst range is 0.01% to 1%. Suitable inert liquids include benzene, toluene, xylene, dioxane, diethyl ether, chloroform, hexane, tetrachloroethane, tetrahydrofuran, n-heptane, and the like. Any concentration of lactone in solvent may be used with a preference for 25% to 70% by weight of lactone. The temperature of polymerization may vary from —40° C. up to about 180° C. with a preferred range of —20° C. to 100° C. Mixtures of catalysts may be used, as well as single catalyst systems. It is also preferred and, in most instances, necessary to conduct all procedures under careful anhydrous and anaerobic conditions to obtain optimum polymeric products.

The following example illustrates a polymer preparation.

EXAMPLE 1

All of the manipulations in setting up this example are carried out in a "dry box" or "glove box" containing a nitrogen atmosphere in an effort to make conditions anhydrous and anaerobic. Hypodermic syringe techniques are used to transfer initiator. 11.9 g. (0.119 mole) δ-valerolactone, in a screw top vial with a polyethylene liner, is reacted at room temperature (about 25° C.) with 0.2 cc. aluminum triisobutyl solution (25% in heptane). The δ-valerolactone, $n_D^{29\frac{1}{2}}$ 1.4555, is obtained by cracking a resinified laboratory sample followed by fractionation. The sealed vial is placed onto a shaker over night but no polymerization occurs. 0.4 cc. more aluminum triisobutyl solution is added under anhydrous anaerobic conditions and the vial replaced onto the shaker. A firm gel is noted within ¾ hour, as well as slight warmth to the touch. After ¾ hour more the vial is placed into a 47° C. oven for three hours and then allowed to stand over the weekend at room temperature. The vial cracked spontaneously on standing. The conversion is apparently quantitative and the product is one piece. The polymer is pumped overnight to remove traces of hydrocarbon from the catalyst solution. The high polymer product is a tough, resilient, opaque, milky-appearing resin-like material. Tough resilient flexible films can be made at 100° C. on a Carver press. Monofilaments can also be made from the molten polymer. Both films and monofilaments cold draw to clear transparent tough materials. Drawn and undrawn films have high tear strength. The softening temperature range is 58–68° C. as measured on a Mannheim block. A capillary melting point is 54–58° C. The final melting point is that at which the polymer is completely optically clear and homogeneous in all directions. This is similar to the changes noted in Profax (Hercules) polypropylene. X-ray diffraction patterns of stretched films show a highly crystalline highly oriented structure similar to a classical fiber diagram. The tensile strength and true ultimate tensile strength of a film are 3,360 and 15,200 p.s.i., respectively. It dissolves in acetone, tetrachloroethane, ethyl acetate, ethylene dichloride, carbon tetrachloride and toluene. Fibers and films can be formed from solutions (i.e., tetrachloroethane). The inherent viscosity at 25° C. ($\eta_{inh}$) in tetrachloroethane for c.=0.5 is 2.23. The viscosities are determined at 25° C. using a solvent. The inherent vsicosity $$(\eta_{inh}) = \left(\frac{\text{Ln } \eta_r}{c.}\right)$$

where $\eta_r$ is the relative viscosity and c. is the concentration in grams per 100 ml. of solvent.

The reduced viscosity (viscosity number) $= \frac{\eta_{rel}-1}{c.}$

The production of the improved products of this invention from polylactones (as produced above) is achieved by reacting said polylactones with a free-radical forming system to effect cross-linking. The preferred free radical forms are:

organic peroxides (e.g. dicumyl peroxide, benzoyl peroxide, acetyl peroxide, 2,4-dichlorobenzoyl peroxide, stearoyl peroxide, di-tertiary butyl peroxide, tert-butyl perbenzoate, etc.)
hydroperoxides
azides (i.e. disulfonazide, aromatic diazide, etc.)
azo compounds
diazonium compounds, and
diazoamino compounds with or without sulfur or the additive catalytic or sensitizing effect and action of ultra-violet light or other forms of radiation. The temperature for carrying out the heat initiated crosslinking process should be above the temperature at which free radical forms are incorporated and preferably at temperatures from 100° C. to about 250° C. Further improvement in properties can be obtained by the incorporation of fillers such as calcium carbonate, metal oxides (i.e. iron oxide), silica, neutral or basic carbon blacks, etc.

The particular peroxide or other radical forms chosen depends on: (1) the half life of the radical forming compounds, (2) the means of incorporating the radical forms and other ingredients into the polymer formulation (i.e. solvent casting, roll mill, Banbury mill, melt extruder, etc.), (3) the temperature level requirement for carrying out formulations and relationship to curing temperature level, (4) the forms of energy used to trigger the radical forms (i.e. heat, ultraviolet light, visible light, and sensitizing system, etc.), (5) the relative rates of competing reactions during crosslinking, and (6) the specific application or use of the total polymer formulation. Shaped articles can therefore be formed in appropriate equipment and then thermoset by selecting appropriate formulations and manipulative conditions and equipment.

The time for producing the products of this invention is not critical and varies from 1 minute to about 1 hour, and preferably from 1 minute to about less than 30 minutes. The amount of catalyst may vary from about 0.5% to about 10% by weight thereof based on the weight of polylactone.

In the following examples which are illustrative only, parts are by weight unless otherwise indicated.

EXAMPLE 2

All manipulations in this and the following examples are carried out in a "dry box" or "glove box" containing a nitrogen atmosphere in an effort to make conditions anhydrous and anaerobic. Hypodermic syringe techniques are used to transfer initiator. A specially cleaned and nitrogen purged screw top bottle with a polyethylene liner is used as the reaction vessel. 237 grams ε-caprolactone fractionally redistilled and collected under nitrogen is reacted in an 8 ounce screw top bottle at room temperature with 2.5 cc. aluminum triisobutyl solution (25% in heptane). The bottle is sealed immediately and shaken by hand. After ½ hour the bottle is placed in a 40–50° C. oven for 3½ hours. The reaction has gone to completion in this time. The bottle is replaced in the oven at 37–40° C. till the next morning. The yield is substantially quantitative. The product is a tough, resilient, opaque material that can be made into tough, flexible, resilient films on a press or from solutions, and into monofilaments from melts or solutions. The relative viscosity at 25° C. of an 0.5 g./100 ml. tetrachloroethane solution using a Ubbelhode viscosimeter is 4.60.

EXAMPLE 3

A small 2-roll rubber mill with rollers capable of being warmed by steam is used to compound poly(ε-caprolactone) produced similarly as in Example 2 with dicumyl peroxide. 30 grams poly(ε-caprolactone) ($\eta_{inh}$ is 3.05 in tetrachloroethane at 25° C. at a concentration of 0.5/100 ml. solvent) is formulated with 1.5 g. dicumyl peroxide by warming and working on the mill in the course of twenty minutes. Films for testing are made and cured in a Carver press at 160° C. Formulated films are 1, 2 and 3 below and the original unformulated material is 4 below. The cured films remain tough materials which can still be cold drawn but whose solvent and thermal properties have changed. 1, 2 and 3 are insoluble in acetone and toluene with no swelling and 4 is soluble (at room temperature). This indicates cross-linking. A small sliver of polymer is examined on the Manheim heating block by placing between two microscope cover glasses while periodically applying pressure on the upper cover glass and observing with a built-in magnifying glass. The 67–70° range in No. 4 can be considered the softening range. In 2 and 3 the pieces maintain their shape; in the 84–240° C. range they act like pieces of rubber, retracting to their original dimensions when probing pressure is removed. The pieces do not adhere to the cover glass in the rubbery state.

| Carver press time, min. | Tensile, p.s.i. | Percent elongation at break | Yield stress, p.s.i. | Thermal behavior on a Mannheim block |
|---|---|---|---|---|
| 1 | 5 | 3,440 | 1,195 | 1,600 | |
| 2 | 15 | 2,930 | 1,009 | 1,660 | Clears without pressure at 61° C. but shows no permanent deformation on probing to 240° C. when decomposition begins. Rubbery range is 84–240° C. |
| 3 | 60 | 2,810 | 971 | 1,550 | Similar to 2. |
| 4 | 1 | 7,650 | 2,107 | 1,910 | Clears without pressure at 67° C. and flows under pressure permanently at 70° C. |

EXAMPLE 4

The same poly(ε-caprolactone) as in Example 2 is compounded as before on a 2-roll mill. 20 grams poly(ε-caprolactone) is first compounded with 10 g. calcium carbonate (Whitcarb R from Witco Chem. Co.) and then with 1.0 gram dicumyl peroxide. Total time on a steam-warmed mill is 25 minutes. Films for testing are cured as before on a Carver press at 160° C. Samples 1, 2 and 3 are insoluble in acetone without any swelling but can be cold drawn.

| Carver press time, min. | Tensile, p.s.i. | Percent elongation at break | Yield stress, p.s.i. | Thermal behavior on a Mannheim block |
|---|---|---|---|---|
| 1 | 5 | 2,910 | 988 | 2,030 | |
| 2 | 15 | 2,730 | 1,010 | 2,280 | Similar to 3. |
| 3 | 60 | 2,610 | 756 | 2,230 | No flow with or without pressure till 242° C., at 242° C. seems rubbery but no permanent deformation. |

The cross-linking here gives a significantly higher yield stress than in Example 3 and the thermal properties appear greatly changed from the original unformulated polymer.

EXAMPLE 5

The same poly(ε-caprolactone) as in Example 2 is compounded as before on a 2-roll mill. 20 grams poly(ε-caprolactone) is first compounded with 5 g. iron oxide (Mapico 297 from Columbian Carbon), then 1 g. dicumyl peroxide and then 5 more grams iron oxide. The total mill time is 14 minutes. Films are made at 160° C. on a Carver press for testing. All the films below are insoluble in toluene and the thermal properties on a Mannheim heating block are similar to those of the products in Example 4.

| Carver press time, min. | Tensile, p.s.i. | Percent elongation at break | Yield stress, p.s.i. |
|---|---|---|---|
| 1 | 2 | 4,360 | 1,720 | 1,800 |
| 2 | 5 | 2,670 | 842 | 1,890 |
| 3 | 15 | 2,640 | 846 | 1,680 |
| 4 | 30 | 2,640 | 930 | 1,220 |

Metal oxides other than iron oxide, silicas, and neutral or basic carbon blacks can be used as fillers to give enhanced desirable properties of the filled cross-linked polyacetone.

EXAMPLE 6

The formulation is the same as Example 3 except that 15 g. iron oxide and ¾ g. dicumyl peroxide are used. The 2 mill rolls are about 170° F. initially as shown by a surface pyrometer. Total mill time is 16 minutes. The solubility properties and Mannheim heating block behavior are similar to those of products of Examples 4 and 5. This formulation shows a higher yield stress than Example 5.

| Carver press time, min. | Tensile, p.s.i. | Percent elongation at break | Yield stress, p.s.i. |
|---|---|---|---|
| 1 | 2 | 3,310 | 1,178 | 1,930 |
| 2 | 5 | 3,440 | 1,142 | 2,160 |
| 3 | 15 | 2,680 | 934 | 2,060 |
| 4 | 30 | 2,680 | 986 | 1,990 |

EXAMPLE 7

Films of polycaprolactone containing dicumyl peroxide are prepared on the inside surface of a four ounce screw top bottle by dissolving two grams poly(ε-caprolactone) in 25 cc. benzene, adding dicumyl peroxide (0.04 g/cc. benzene solution) and then evaporating off all the solvent using a rotating flask evaporator and vacuum. The films from the above solutions after heating in an oil bath are characteristic of a cross-linked polymer that does not dissolve in benzene.

| Dicumyl peroxide solution, cc. | Cure temperature ° C. | Cure time |
|---|---|---|
| 2½ | 130 | 4 hrs., 10 min. |
| 2½ | 150 | 2 hrs., 10 min. |

Films with lower dicumyl peroxide concentrations and lower cure times at the above temperatures also show signs of cross-linking. The products can be cold drawn and are tough.

EXAMPLE 8

A sample as in Example 7 is prepared using 2½ cc. catalyst solution but solvent benzene is not removed before heating at 130° C. for 4 hours 10 minutes. A highly swelled gel forms in the benzene solution. The isolated product after pumping off solvent is a tough polymer that can be cold drawn.

EXAMPLE 9

Films of poly($\epsilon$-caprolactone) on the inside of 4 ounce bottles are prepared as in Example 7 but containing benzoyl peroxide (2 or 4 cc. benzene solutions of a 0.02 g. benzoyl peroxide/cc.). Cures of both catalyst concentrations are carried out at 125° C. for 15 minutes and a half hour to give materials insoluble in benzene. Pumped off crosslinked films are very tough materials. The cross-linked material can be cold drawn by hand. Examination on a heating block shows that softening point has been raised greatly above that of the starting material and behavior is similar to that in Example 3.

EXAMPLE 10

25 g. poly(2-p-dioxanone), 5 g. calcium carbonate (Whitcarb R) and 1 g. dicumyl peroxide are formulated on a steam heated 2-roll rubber mill as in Example 3. The unformulated poly(2-p-dioxanone) is polymerized as in Example 3 and is a tough film and filament forming material that can be cold drawn and has a capillary melting point (to clearing) of about 110° C. The total mill time is 7 minutes. Films for testing are cured in a Carver press for 2 and 5 minutes at 160° C. The polymer remains a tough material that can be cold drawn but is insoluble in tetrachloroethane and m-cresol. These are both solvents for tough film and filament forming high molecular weight poly(2-p-dioxanone). Examination on a Mannheim heating block shows a rubbery zone at 100–190° C. analogous to Number 2 in Example 3.

EXAMPLE 11

28 g. poly($\epsilon$-caprolactone) and ¾ gram Porofor N (azobisisobutyronitrile) are compounded on a steam heated 2-roll rubber mill as in Example 3. Total mill time is 11 minutes. It is quickly evident that reaction is taking place on the mill. Testing of a sample from the mill for solubility in benzene at room temperature shows cross-linking to have taken place.

EXAMPLE 12

Poly($\delta$-valerolactone) prepared in a manner similar to Examples 1 and 2 and having similar properties is compounded and cured as in Example 3 to give a change in properties similar to that described in Example 3.

EXAMPLE 13

Poly(exaltolide) prepared in a manner similar to Example 1 (but at 85° C.) and having similar properties (but higher capillary melting point) is compounded and cured in a manner similar to Example 3 to give a change in properties similar to that described in Example 3.

EXAMPLE 14

A tough poly($\epsilon$-caprolactone) film, containing benzoyl peroxide, cast from benzene solution, irradiated in ultraviolet light in a quartz tube at no higher than 35° C. overnight, is shown to be cross-linked by testing for solubility in benzene. The film swells a little in the benzene and can be cold drawn by hand.

EXAMPLE 15

A poly($\epsilon$-caprolactone) film containing 2,4-dichlorobenzoyl peroxide is made by weighing 1.10 g. of 50% 2,4-dichlorobenzoyl peroxide in dibutyl phthalate into a solution of 15.0 g. polymer from Example 2 in 100 cc. benzene. A piece of film is exposed at room temperature in a quartz tube to an ultra-violet lamp and another piece is heated in the absence of air at 90° C. for 1 hour. Both show evidence of cross-linking. They remain coherent though somewhat swelled films on testing in benzene.

EXAMPLE 16

The thermal properties of formulated and unformulated poly($\epsilon$-caprolactone) and other polymers for reference are also studied by a thermomechanical procedure. An apparatus is built in which a static load can be placed on a piece of polymer film of known initial dimensions while temperature is raised gradually. A thermocouple placed near the film and attached to a recorder gives the temperature gradient, and a manually operated device for shorting the thermocouple makes it possible to record the temperature at the moment the film breaks completely into two pieces or "collapses." The vertical heater consists of a 2" diameter glass tube uniformly wound with resistance wire and about 3 feet long. The approximately ½" x 2" x 12–15 mil pieces of film are suspended about ⅓ of the length from the top and gripped between two clamps (usually 1" grip separation). A weight external to the heater hangs by a wire or fine chain from the lower grip. The thermocouple is opposite the center of the film initially and no more than ½" from it. Representative results on formulated and unformulated poly($\epsilon$-caprolactone) and comparison to known polymers are in the following tables. The temperature gradients are about 1½–2° C./minute.

| | Polymer film | Initial static load, p.s.i. | "Collapse" temperature, °C. | Remarks |
|---|---|---|---|---|
| 1 | Made from Ex. 2 | 16½ | 58 | Warm polymers after break rubbery and show large reversible extensibility until cooled down. |
| 2 | do | 377 | 59 | |
| 3 | 15 minute film from Ex. 6. | 20.7 | 239 | Elongation during process and almost complete recovery on break shows rubbery nature in heated state. |
| 4 | do | 426 | 100 | |
| 5 | 30 minute film from Ex. 3. | 343 | 81 | |
| 6 | Polyethylene (low M.P. type) Bakelite DYNH-3. | 19.3 | 103 | |
| 7 | do | 390 | 83 | |
| 8 | Polyethylene (stereoregular type, Fortiflex, Celanese). | 26 | 131 | "Softening temperatures" from Technical Bulletin is 126.7° C. |
| 9 | Polypropylene (Proflex, Hercules). | 23 | 166 | M.P. 167° C. by disappearance of birefringence—Hercules Technical Bulletin. |
| 10 | Nylon 66 (Zytel-101, Du Pont). | 38 | 252 | |

EXAMPLE 17

The procedure of Example 7 is repeated except that the following free radical initiators are used in place of dicumyl peroxide:
(A) 4,4'-diazidodiphenyl sulfone
(B) 4,4'-diphenyl diazide
(C) 4-nitrophenyl diazonide salt and ultraviolet light
(D) phenyl azide
(E) A mixture of 4,4'-diphenyldiazide and dicumyl peroxide
(F) A mixture 60% benzoyl peroxide and 40% dicumyl peroxide
(G) Tert-butyl hydroperoxide
(H) Tert-butyl hydroperoxide 70% and di-tert-butyl peroxide 30%

Similar results were obtained as in Example 7.

It is claimed:

1. A process for producing cross-linked polyactones of improved thermal and decreased solvent solubility properties which comprises heating at a temperature of from about 100° C. to 250° C. the precursor polyactone homopolymer derived from a lactone of the formula:

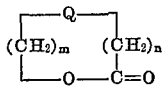

wherein
(1) Q is selected from the group consisting of —O—, —CH$_2$—, and —S—;
(2) $m$ and $n$ are integers from 1 to 10; and
(3) $m+n$ is at least 3, with from about 0.5% to about 10% by weight based on the weight of said polylactone of a free radical initiator for a time sufficient to effect a cross-linking reaction.

2. A process as defined in claim 1 wherein the catalyst is selected from the group consisting of organic peroxide, organic hydroperoxide, azide, azo, diazonium, and diazoamino compounds.

3. A process as defined in claim 2 wherein the heating time ranges from about 1 minute to 1 hour.

4. A process as defined in claim 1 wherein the precursor polylactone is characterized by a viscosity number of from about 1.0 to 10.0.

5. A process as defined in claim 3 wherein the radical former is an organic peroxide.

6. A process as defined in claim 3 wherein the precursor polylactone is characterized by a viscosity number of from about 1.5 to about 6.0.

7. A process as in claim 1 carried out in the presence of filler selected from the class consisting of calcium carbonate, neutral and basic carbon blacks, inorganic metal oxides and silicas.

8. A product produced by the process of claim 1.

9. A product produced by the process of claim 6.

10. A product produced by the process of claim 7.

References Cited

UNITED STATES PATENTS

| | | | |
|---|---|---|---|
| 3,021,313 | 2/1962 | Cox et al. | 260—78.3 |
| 3,021,317 | 2/1962 | Cox et al. | 260—78.3 |

FOREIGN PATENTS 797,317  10/1968  Canada.

MORRIS LIEBMAN, Primary Examiner

L. T. JACOBS, Assistant Examiner

U.S. Cl. X.R.

260—78.3.